April 5, 1949.　　H. A. MATHEWS　　2,466,034
TENSION MEASURING DEVICE
Filed Oct. 1, 1946
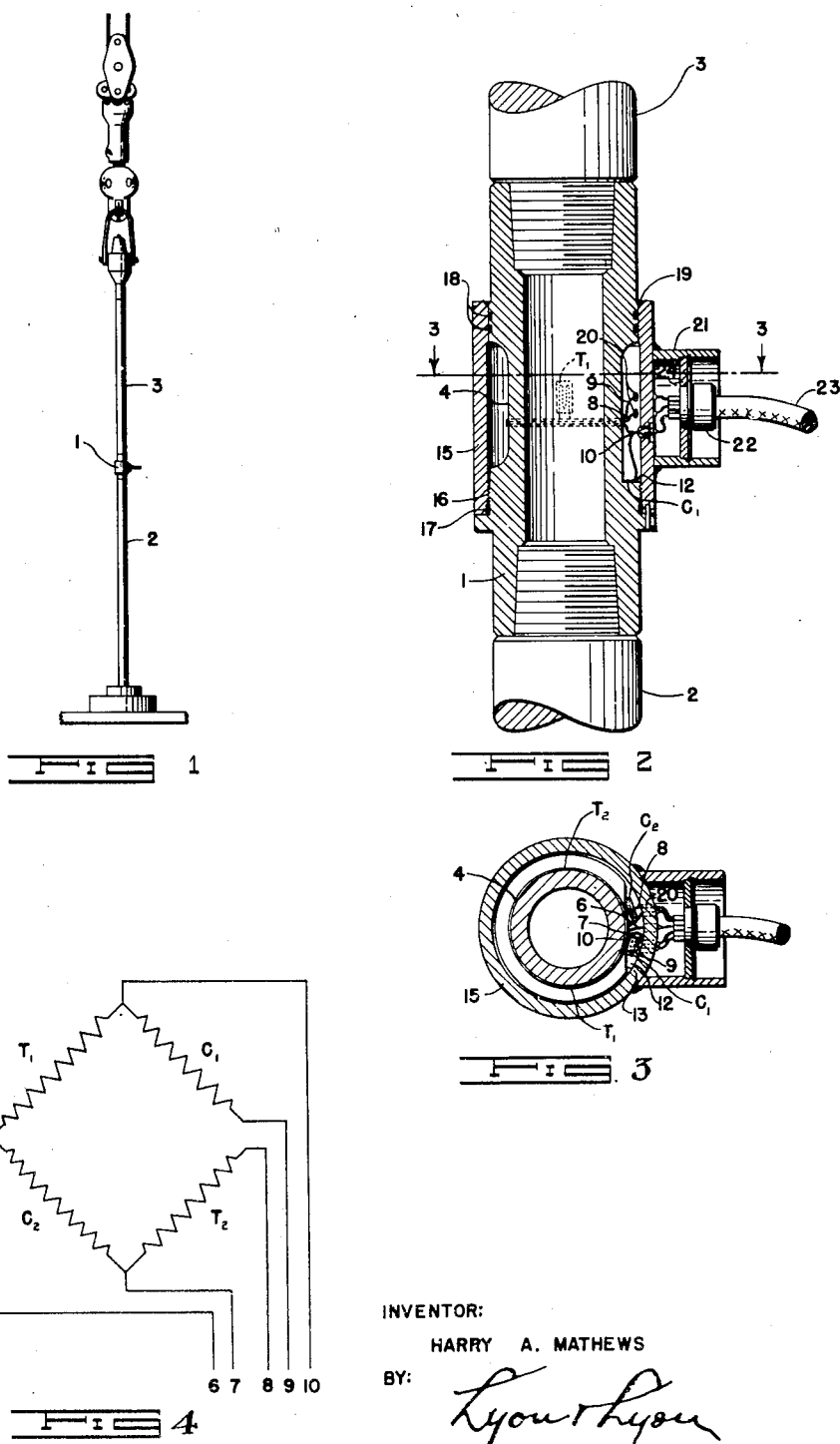
INVENTOR:
HARRY A. MATHEWS
BY:
*Lyon & Lyon*
ATTORNEYS Patented Apr. 5, 1949

2,466,034

UNITED STATES PATENT OFFICE 2,466,034

TENSION MEASURING DEVICE

Harry A. Mathews, Garvey, Calif., assignor to Byron Jackson Co., Vernon, Calif., a corporation of Delaware Application October 1, 1946, Serial No. 700,482

8 Claims. (Cl. 201—63)

This invention relates to tension measuring devices and particularly to devices for measuring tension in tubular conduits subjected to internal fluid pressure, such as drill pipe, tubing and well casing used in the drilling and production of oil wells.

It is frequently desirable to exert a predetermined tensile strain on a string of pipe suspended in an oil well, particularly when performing the operation of setting or releasing a well packer or cement retainer, or when conducting fishing operations, or the like. Weight indicators, of the type presently used in conjunction with drilling operations, lack the required accuracy and sensitivity for the above purposes. In many of the aforementioned operations, it is customary to pump water or drilling fluid down the pipe to perform, by fluid pressure, certain operations on the device attached to the lower end thereof. The application of internal pressure to the pipe creates tensile stress therein and, in order to measure accurately the strain exerted at the lower end of the pipe by an upward pull at the upper end thereof, independently of the tensile stress resulting from internal pressure, it is necessary to compensate for, or cancel out, the tensile stress due to pressure.

A principal object of this invention is to provide means for accurately measuring tension in a tubular member.

A further object is to provide means for accurately measuring tension in a tubular member subjected to internal fluid pressure, and to compensate for the tensile stress resulting solely from the application of internal fluid pressure.

A still further object is to provide a device for measuring tension, embodying the use of bonded wire resistance strain gauges.

A more specific object is to provide a tubular member adapted to be connected in a string of pipe subjected to tension, wherein bonded wire resistance strain gauges are attached to the tubular member in a manner to be responsive to tension therein, and wherein other gauges are attached to the tubular member in a manner to compensate for the effect of internal pressure on the tension gauges.

A still further object is to so arrange the compensating gauges that they not only nullify the effect of internal pressure on the tension gauges, but also augment the resistance change in the tension gauges in response to tension in the tubular member and thereby increase the sensitivity of the bridge circuit.

Other objects and advantages of my invention will be apparent from the following detailed description of the preferred embodiments thereof as illustrated in the accompanying drawings, in which:

Figure 1 is a fragmentary elevational view with the stem of pipe shown in relation to a rotary table and elevated mechanism and indicating the location of the tension measuring device.

Figure 2 is an enlarged longitudinal sectional view of the tension measuring device.

Figure 3 is a transverse sectional view thereof through 3—3 of Figure 2.

Figure 4 is a wiring diagram showing the manner in which the tension measuring elements and the compensating elements are electrically connected.

A hollow nipple 1, threaded at each end for connection to adjacent sections 2 and 3 of a string of pipe, such as drill pipe or tubing, constitutes the tension member. The central portion of the nipple is reduced in diameter at 4 and is machined internally and externally to provide a cross-section of predetermined area. A pair of main tension gauges $T_1$ and $T_2$ are bonded to the outer surface of the reduced portion 4 at diametrically opposite points, with their long axes extending parallel to the axis of the nipple. These gauges are preferably of the bonded wire electrical resistance type, such as disclosed in Simons Patent No. 2,292,549 and known to the trade as Baldwin SR–4 strain gauges. With the gauges $T_1$ and $T_2$ bonded to the nipple in the manner shown, the electrical resistance of each filament increases when the nipple is subjected to tension, the change in resistance being a linear function of the tensile strain.

In many contemplated uses of this device, the tension in the string of pipe, in which it is incorporated, must be accurately measured while the pipe is subjected to internal fluid pressure. The gauges $T_1$ and $T_2$ undergo a slight increase in resistance, due to a combination of bursting stress and tensile stress, resulting solely from the application of internal pressure to the nipple. In order to compensate for this change in resistance and thus maintain the Wheatstone bridge in balance, except when a pull is exerted on the pipe string, a pair of compensating gauges $C_1$ and $C_2$ are mounted on the nipple and electrically connected with the tension gauges, in the manner shown in Figure 3.

In determining the location of the compensating gauges, consideration must be given not only to their function of compensating for pressure effect on the tension gauges, but also to their effect on the output of the bridge circuit under tension loading conditions. Referring to Figure 3, it will be observed that the two tension gauges are connected in opposite arms of the bridge, as are, also, the two compensating gauges. It is well known that such a bridge is balanced and no voltage difference exists between the leads 7 and 10, when the resistances in the four arms bear the relationship of $T_1:C_1::C_2:T_2$, or stated otherwise, $T_1 \times T_2 = C_1 \times C_2$. It is, therefore, apparent that, in order to compensate for an increase in resistance of $T_1$ and $T_2$, resulting from internal fluid pressure, the resistance of $C_1$ and $C_2$ must increase proportionately. However, $C_1$ and $C_2$ should be so positioned on the nipple that their resistance remains constant or decreases under tension loading of the nipple, in order to avoid decreasing the sensivity of the bridge under tension loading. If the gauges $C_1$ and $C_2$ were positioned on the outer cylindrical surface 4 at right angles to the gauges $T_1$ and $T_2$, so as to be substantially insensitive to tension loading, the increase in diameter of the nipple under internal pressure would cause an increase in resistance of $C_1$ and $C_2$ many times the slight increase in resistance of $T_1$ and $T_2$. On the other hand, if $C_1$ and $C_2$ were oriented into an intermediate position between transverse and axial directions, their sensitivity to internal pressure could be made proportional to that of the gauges $T_1$ and $T_2$, but they would then experience an increase in resistance under tension loading approaching that of $T_1$ and $T_2$ and the sensitivity of the bridge circuit to tension loading would be greatly decreased.

I have discovered that both of the above-mentioned desired characteristics of the gauges $C_1$ and $C_2$ may be obtained by suitably positioning them on a radially extending shoulder provided for this purpose on the nipple. As shown most clearly in Figure 2 of the drawing, the reduced section 4 of the nipple terminates in a large fillet at the junction with the full diameter end portions. At one end, herein the bottom end, a segment has been cut away to provide a right angle shoulder 12 (Figures 2 and 4), the inner boundary of which is tangent to the reduced section at 13 (Figure 4).

The gauges $C_1$ and $C_2$ are bonded to the surface 12 and, in the illustrated embodiment, their long arms extend approximately in a tangential direction.

When the nipple is subjected to internal fluid pressure, the radial expansive force tends to increase both the inner and the outer radial dimensions of a transverse section such as that in the plane of the surface 12. This produces tension in a circumferential direction and causes an increase in resistance of a gauge mounted tangentially, as in the case of gauges $C_1$ and $C_2$. Internal pressure also tends to decrease the thickness of the section, so that a gauge mounted with its long axis extending radially would be subjected to compression and would experience a decrease in resistance. A gauge mounted in a position intermediate a radial and a tangential position would be subjected to a circumferential tension component and to a radial compression component, the net change in resistance depending on the magnitude of the two components. The shoulder 12 provides a surface of sufficient area to permit the gauges to be mounted in any angular position to attain the desired result.

As previously mentioned, the change in resistance of the tension gauges $T_1$ and $T_2$ resulting from the application of internal fluid pressure is very slight. If the compensating gauges $C_1$ and $C_2$ were mounted in a tangential position and were sensitive to strain in a section substantially equal to the section on which the gauges $T_1$ and $T_2$ are mounted, the change in resistances of the gauges $C_1$ and $C_2$, due to internal pressure would be much greater than that of the gauges $T_1$ and $T_2$. It will be noted, however, that by mounting the gauges $C_1$ and $C_2$ on the shoulder 12, they respond to strain in a section of much greater wall thickness than that on which the gauges $T_1$ and $T_2$ are mounted. Hence, the circumferential strain measured by gauges $C_1$ and $C_2$ is also of a low order commensurate with the tension strain at the gauges $T_1$ and $T_2$, resulting from internal pressure.

From the foregoing, it will be apparent that the gauges $C_1$ and $C_2$ may be so positioned on the surface 12 as to nullify the effect of internal pressure on gauges $T_1$ and $T_2$. When an axial pull is exerted on the pipe string, gauges $T_1$ and $T_2$ increase in resistance in direct proportion to the tensile strain produced in the reduced section 4, causing an unbalance of the bridge circuit. The elongation produced by tension also causes a slight reduction in diameter of all sections of the nipple, resulting in compression of the section on which the gauges $C_1$ and $C_2$ are mounted. These gauges, therefore experience a decrease in resistance due to tension in the nipple, and the unbalance of the bridge circuit is thereby increased. The output of the bridge circuit for a given tension load is, in this manner, increased resulting in greater sensitivity to tension loading. Small loads and small increments of load may thus be measured with greater accuracy.

In order to protect the gauges and their electrical connections against moisture and physical damage, the gauge section of the nipple is enclosed in a sturdy, moisture-proof housing 15, which is threadedly connected at 16 to the enlarged section of the nipple adjacent the shoulder 12. Seals 17 and 18 of the "O-ring" type are provided at each end of the housing, and the un-shouldered end may be further sealed by applying sealing compound at 19.

The terminal leads 6, 7, 8, 9, 10 from the gauges extend through suitably spaced openings 20 in the housing 15 and into the base portion of an outlet box 21 secured to the housing. The leads are connected to a terminal plug 22 attached to the end of a five-conductor cable 23 and secured to a partition plate 24 mounted in the outlet box. The cable extends to a suitable instrument (not shown) wherein the output of the bridge circuit is indicated and/or recorded in a manner well known to the art.

Although I have shown and described what is now considered a preferred embodiment of the invention, it is apparent that various modifications may be made therein without departing from the spirit of the invention or the scope of the appended claims.

I claim:

1. A tension measuring device for tubular elements subjected to tension and to internal fluid pressure, comprising: a first means secured to said element so as to be responsive in one sense directly to tension in the element, and responsive in the same sense but to a lesser degree to internal pressure; a second means also secured to said element so as to be responsive, in the same sense and same degree as said first means to internal pressure, and responsive in a relatively slight degree but in the sense opposite to that of said first means to tension in said element, whereby upon opposing the response of said second means to the first means tension may be measured independently of the internal pressure against said tubular element.

2. A tension measuring device for tubular elements subjected to tension and to internal fluid pressure, comprising: a first means including electrical conducting material whose electrical resistance varies with strain bonded throughout its effective length axially to a lengthwise surface of said element so as to be subjected to tension strains therein and subject in the same sense but to a lesser degree to internal pressures therein; a second means also including conducting material whose electrical resistance varies with strain bonded throughout its length to a transverse surface of said element so as to be responsive in one sense to internal pressure and in the opposite sense to tension in the element, whereby the first and second means may be connected in opposition to be responsive to tensional strain but substantially non-responsive to internal pressure.

3. A tension measuring gauge for tubular structures subjected to internal pressures, comprising: a tubular element interposed in said tubular structure and having a relatively thin-walled section and a relatively thick-walled section, the latter having a transverse surface; bonded wire resistance strain gauges mounted on said thin-walled section and on said transverse surface, and adapted for electrical connection wherein changes in their resistances due to pressures within said tubular element tend to cancel each other, and changes in their resistances due to tensional strains on said tubular element augment each other.

4. A tension indicator for well pipe subjected to tensional loads and internal pressures, comprising: a tubular element interposed in said well pipe and having a reduced section subject to elongation when under tension, said tubular element defining an axially facing shoulder, tending to contract circumferentially when said tubular element is under tension; and bonded wire resistance strain gauges mounted on reduced section and said shoulder.

5. A tension indicator for well pipe subjected to tensional loads and internal pressures, comprising: a tubular element interposed in said well pipe and including a tubular section of reduced wall thickness, a tubular section having relatively thick walls and defining an axially facing shoulder; bonded wire resistance gauges oriented longitudinally on said tubular section for indicating elongation thereof due to tension and responsive to a lesser degree to changes in said tubular section due to internal pressures; and other bonded wire resistance gauges oriented circumferentially on said shoulder, and adapted to be electrically associated with said first gauges to oppose changes therein, due to internal pressures.

6. A tension indicator for well pipe subjected to tensional loads and internal pressures, comprising: a tubular element interposed in said well pipe, said tubular element including a central section of reduced wall thickness and end sections of greater wall thickness, at least one of said end sections having an axially facing shoulder the surface of which defines a plane at right angles to the axis of said central section: and bonded wire resistance strain gauges mounted on said reduced section and said shoulder.

7. A tension indicator for well pipe subjected to tensional loads and internal pressures, comprising: a tubular element interposed in said well pipe, said tubular element including a central section of reduced wall thickness and end sections of greater wall thickness, at least one of said end sections having an axially facing shoulder the surface of which defines a plane at right angles to the axis of said central section; bonded wire resistance gauges oriented longitudinally on said tubular section for indicating elongation thereof due to tension and responsive to a lesser degree to changes in said tubular section due to internal pressures; and other bonded wire resistance gauges oriented circumferentially on said shoulder, and adapted to be electrically associated with said first gauges to oppose changes therein due to internal pressures.

8. A tension gauge for tubular members subjected to internal pressures, comprising: a tubular element, said tubular element adapted to elongate when subject to tensional strains and expand when subjected to internal pressures; tubular means defining an axially directed shoulder, said shoulder adapted to contract circumferentially under tensional loads applied to said means and expand under internal pressures applied to said means, and bonded wire resistance elements disposed on said tubular element and said shoulder and electrically connected to nullify the effect of internal pressure in said tubular element and means.

HARRY A. MATHEWS.

No references cited.